(12) United States Patent
Faccin

(10) Patent No.: US 8,363,626 B2
(45) Date of Patent: Jan. 29, 2013

(54) MECHANISM TO ENABLE DISCOVERY OF LINK/NETWORK FEATURES IN WLAN NETWORKS

(75) Inventor: Stefano M. Faccin, Dallas, TX (US)

(73) Assignee: Nokia Corporation, Espoo (FI)

( * ) Notice: Subject to any disclaimer, the term of this patent is extended or adjusted under 35 U.S.C. 154(b) by 1155 days.

(21) Appl. No.: 11/431,138

(22) Filed: May 8, 2006

(65) Prior Publication Data

US 2006/0268802 A1 Nov. 30, 2006

Related U.S. Application Data

(60) Provisional application No. 60/679,375, filed on May 6, 2005.

(51) Int. Cl.
*H04W 4/00* (2009.01)
(52) U.S. Cl. ........................................ 370/338; 370/328
(58) Field of Classification Search .................. 370/310, 370/328, 331–332, 338; 455/436–440, 442–444
See application file for complete search history.

(56) References Cited

U.S. PATENT DOCUMENTS

| | | | |
|---|---|---|---|
| 7,257,105 B2 * | 8/2007 | Molteni et al. ................ | 370/338 |
| 2004/0253954 A1 | 12/2004 | Lee et al. | |
| 2005/0041808 A1 * | 2/2005 | He ................................ | 380/248 |
| 2005/0177639 A1 * | 8/2005 | Reunamaki et al. .......... | 709/227 |
| 2006/0098610 A1 * | 5/2006 | Sundberg et al. ............. | 370/338 |
| 2006/0217147 A1 * | 9/2006 | Olvera-Hernandez et al. .......................... | 455/552.1 |

FOREIGN PATENT DOCUMENTS

| | | |
|---|---|---|
| WO | 2004104737 A2 | 2/2004 |
| WO | 2004057899 A1 | 7/2004 |

OTHER PUBLICATIONS

A. Dutta, et al.—A Framework of Media-Independent Pre-Authentication (MPA), Internet Draft Feb. 12, 2005. See p. 11-14; p. 17; p. 27-28.
G. Daley, et al.—Some Requirements for a Handover Information Service. Internet Draft Oct. 12, 2005. See whole document.
U.S. Appl. No. 10/194,457, filed Jul. 16, 2002.

* cited by examiner

*Primary Examiner* — Ajit Patel
(74) *Attorney, Agent, or Firm* — Harrington & Smith

(57) ABSTRACT

A mechanism is provided to enable a station to discover link/network/service information about a potential wireless point of attachment by extending the set of information that is available before the station actually authenticates and associates to the wireless point of attachment. The mechanism includes a method for interworking between a Wireless Local Area Network (WLAN), including that defined in IEEE 802.11 Standard Protocol, and one or more other networks, including a 3GPP, 3GPP2 or IEEE 802.16), featuring extending a set of information that is available before a network node actually authenticates and associates to the wireless point of attachment. The network node may be a station (STA), and the beacon may contain the set of information, where the beacon is extended with information that allow a terminal to identify if mobility (handoff) to an access point (AP) implies an L3 handoff or only an L2 handoff, including information about a subnet prefix of a subnet a new AP belongs to. When a station (STA) listens to the beacon, the STA discovers that the AP can provide additional information. If the STA is interested, the STA sends a probe request indicating which information it requires, and the AP returns available information in a probe response based on the information.

23 Claims, 3 Drawing Sheets

The Access Point (AP)

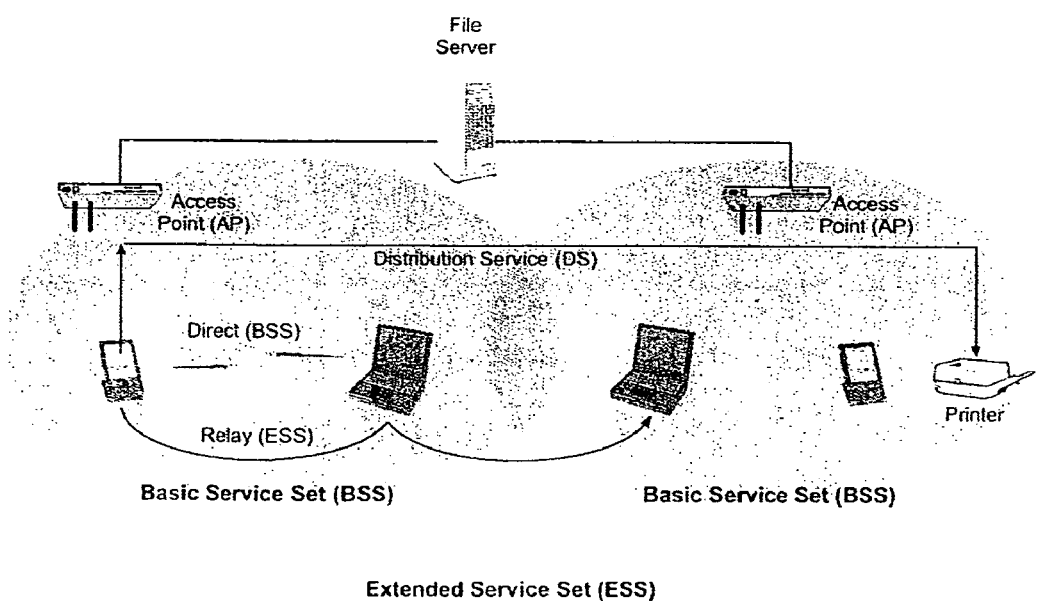
Figure 1: 802.11 Wireless Local Area Network (WLAN)
(Prior Art)

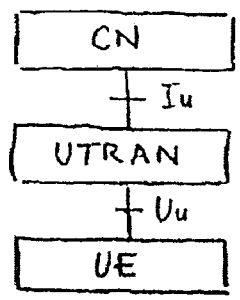
Figure 2a: The Basic 3GPP Network
PRIOR ART
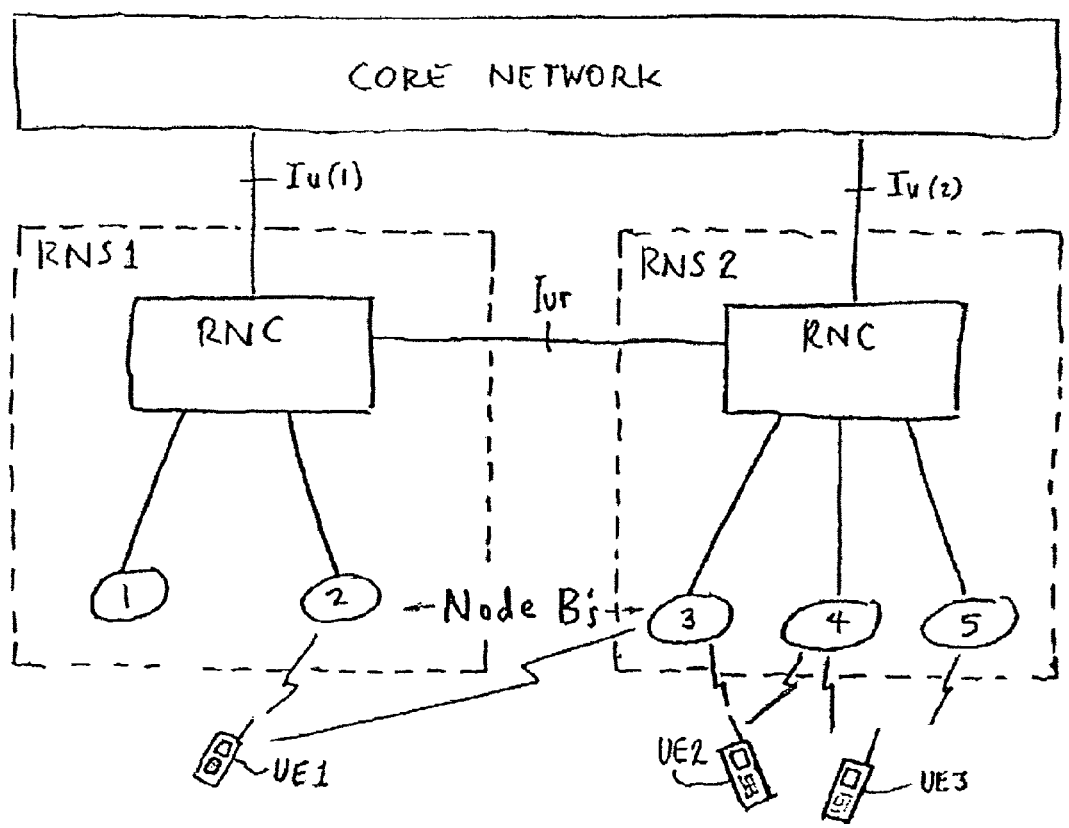
Figure 2b: The 3GPP Network in More Detail
(Prior Art)

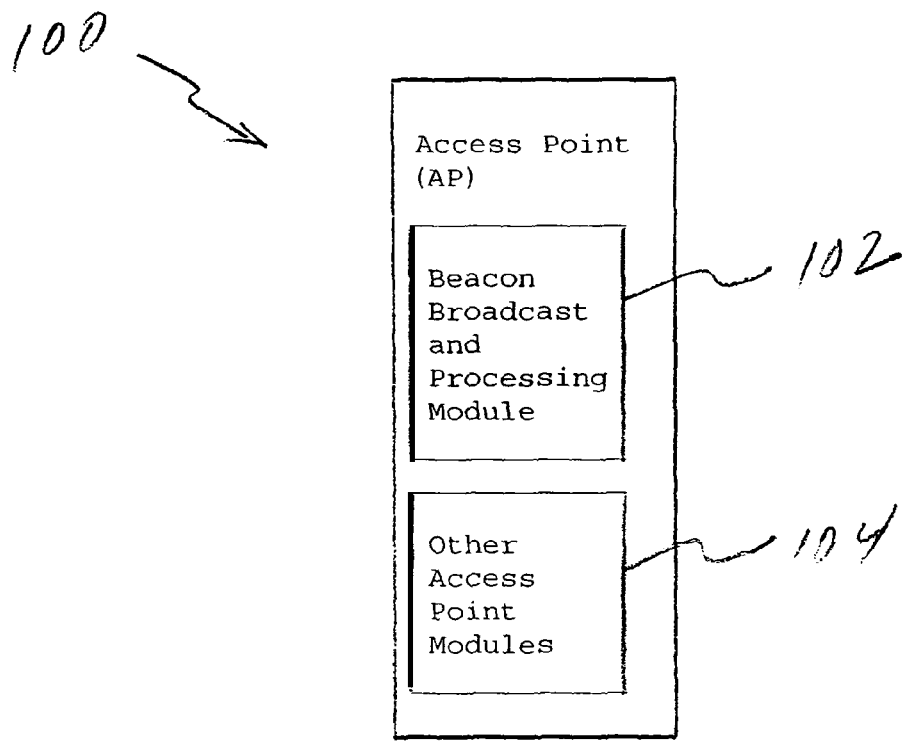
Figure 3: The Access Point (AP)
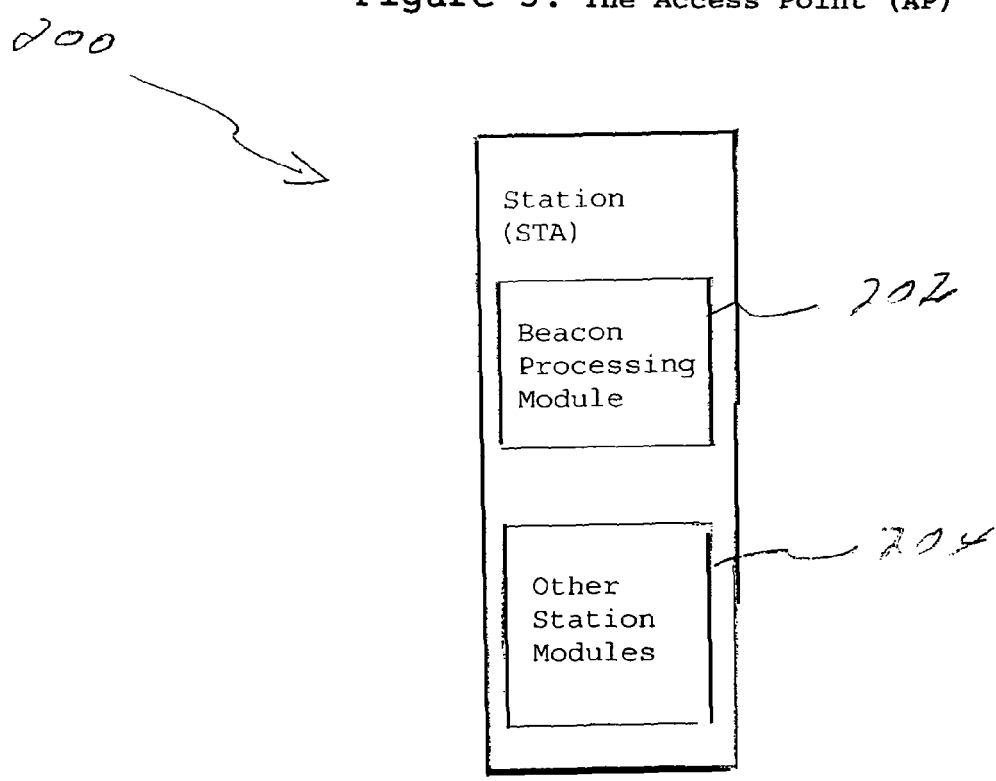
Figure 4: The Station (STA)

MECHANISM TO ENABLE DISCOVERY OF LINK/NETWORK FEATURES IN WLAN NETWORKS

CROSS REFERENCE TO RELATED APPLICATIONS

This application claims benefit to U.S. provisional patent application Ser. No. 60/679,375, filed 6 May 2005, which is hereby incorporated by reference in its entirety.

BACKGROUND OF THE INVENTION

1. Field of Invention

The present invention relates to a Wireless Local Area Network (WLAN) (e.g. defined in the IEEE 802.11 Protocol Specification). Specifically, the present invention refers to the standardization of solutions for interworking between WLAN and other networks (namely the third Generation Partnership Project (3GPP), 3GPP2 and IEEE 802.16 (related to Broadband Wireless Access)). The present invention refers also to the Media Independent Handoff (MIH) solutions being defined in the IEEE 802.21 Protocol Specification.

2. Problem in the art

FIG. 1 shows, by way of example, typical parts of an IEEE 802.11 WLAN system, which is known in the art and provides for communications between communications equipment such as mobile and secondary devices including personal digital assistants (PDAs), laptops and printers, etc. The WLAN system may be connected to a wireless LAN system that allows wireless devices to access information and files on a file server or other suitable device or connecting to the Internet. The devices can communicate directly with each other in the absence of a base station in a so-called "ad-hoc" network, or they can communicate through a base station, called an access point (AP) in IEEE 802.11 terminology, with distributed services through the AP using local distributed services set (DSS) or wide area extended services (ESS), as shown. In a WLAN system, end user access devices are known as stations (STAs), which are transceivers (transmitters/receivers) that convert radio signals into digital signals that can be routed to and from communications device and connect the communications equipment to access points (APs) that receive and distribute data packets to other devices and/or networks. The STAs may take various forms ranging from wireless network interface card (NIC) adapters coupled to devices to integrated radio modules that are part of the devices, as well as an external adapter (USB), a PCMCIA card or a USB Dongle (self contained), which are all known in the art.

FIGS. 2a and 2b show diagrams of the Universal Mobile Telecommunications System (UMTS) packet network architecture, which is also known in the art. In FIG. 2a, the UMTS packet network architecture includes the major architectural elements of user equipment (UE), UMTS Terrestrial Radio Access Network (UTRAN), and core network (CN). The UE is interfaced to the UTRAN over a radio (Uu) interface, while the UTRAN interfaces to the core network (CN) over a (wired) Iu interface. FIG. 2b shows some further details of the architecture, particularly the UTRAN, which includes multiple Radio Network Subsystems (RNSs), each of which contains at least one Radio Network Controller (RNC). In operation, each RNC may be connected to multiple Node Bs which are the UMTS counterparts to GSM base stations. Each Node B may be in radio contact with multiple UEs via the radio interface (Uu) shown in FIG. 2a. A given UE may be in radio contact with multiple Node Bs even if one or more of the Node Bs are connected to different RNCs. For instance, a UE1 in FIG. 2a may be in radio contact with Node B2 of RNS1 and Node B3 of RNS2 where Node B2 and Node B3 are neighboring Node Bs. The RNCs of different RNSs may be connected by an Iur interface which allows mobile UEs to stay in contact with both RNCs while traversing from a cell belonging to a Node B of one RNC to a cell belonging to a Node B of another RNC. One of the RNCs will typically act as the "serving" or "controlling" RNC (SRNC or CRNC), while the other RNC will act as a "drift" RNC (DRNC). The mobile UEs are able to traverse the neighboring cells without having to re-establish a connection with a new Node B because either the Node Bs are connected to a same RNC or, if they are connected to different RNCs, the RNCs are connected to each other. During such movements of the mobile UE, it is sometimes required that radio links be added and abandoned in a handover situation so that the UE can always maintain at least one radio link to the UTRAN.

The interworking of the WLAN (IEEE 802.11) shown in FIG. 1 with other technologies (e.g. 3GPP, 3GPP2 or 802.16) such as that shown in FIGS. 2a and 2b is being defined at present in protocol specifications for 3GPP and 3GPP2. In IEEE protocol specification, such activities are carried out in IEEE 802.11 TGu and in IEEE 802.21 (the latter specification focusing specifically on the handoff of a device).

The interworking of these two types of networks or technologies can be split in two different scenarios:

Roaming: In such case, the STA connects to a new WLAN network, such as that shown in FIG. 1; and Handoff: In such case, the same issues apply, but are more pressing since mobility must take place with minimal delay.

The interworking implies several aspects, but one of the major issues identified is network selection. Specifically, due to the current standards, the STA known in the art can discover very little about a WLAN network before authenticating and associating, where authentication is understood to be the process of determining the identity of a user accessing a system, and where association is understood to be the process of registering with a system or network to allow information to be transmitted and received with a device or system. In operation, a beacon signal is periodically transmitted (broadcast) from devices to identify their device and/or network to allow devices to determine which radio coverage area and device they are communicating with. However, the beacon signal and/or the content of Probe Response messages provide limited information, e.g.:

Both during roaming and handoff, the STA cannot discover whether the required connectivity is supported, e.g. IPv4 versus IPv6, connectivity to the Internet, type of protocols supported (e.g.), etc. (see document [1] below);

Both during roaming and handoff, identifying whether a certain WLAN network enables an STA to roam based on its belonging to a given operator is rather cumbersome (e.g. the STA must store a long list of Service Set Identities (SSIDs), and the list must be kept updated frequently); and During handoff, it is essential for the STA to know whether it is entering a new domain and if the handoff entitles only an L2 handoff or requires a L3 handoff as well. Current solutions have shown to be inefficient and produce considerable delays. Some solutions have been proposed (see documents [3], [4] below).

Besides the interworking with other networks, availability of additional information to an STA regarding a certain network is needed in other scenarios. One example is mesh IEEE 802.11 networks, where different mechanisms for routing and security may be supported, the mesh network may or may not have connectivity to the Internet (i.e. "grounded" mesh versus "freestanding" mesh), and there can be other characteristics the STA needs to know before deciding whether or not to connect to the mesh network, and how to do so and what mechanisms to use.

In the past, several attempts took place to add new information to the WLAN beacon. The size of the beacon and the frequency at which it is sent impacts considerably the system capacity. Adding too much information to the beacon can be damaging (due to impact on the system capacity) and it would not be accepted easily in IEEE 802.11. Specifically, previous proposals that tried to create a new beacon information/type (see document [2]) were met with low acceptance in IEEE. Therefore modifications should be kept at a minimum. This implies that one cannot add all the information actually required to the beacon and let STAs discovery them by listening to the beacon.

The reader is referred to the following documents, which are hereby incorporated by reference in their entirety herein:

[1] "Network Characteristics for AP Selection", documents IEEE 802.11-05/1595r0 and IEEE 802.11-05/1594r0, Airespace;

[2] "Adaptive Beaconing", document 802.11-02/601r0, Nokia

[3] "Domain Identification for predictive handover among different domains", Samsung, IEEE 802.11-04/711r0;

[4] "Access Router Identifier (ARID) for supporting L3 mobility", Samsung, IEEE 802.11-04/710r0 [3] and [4] advocates that, when an handover takes place, the terminal needs to know whether it is moving between different domains (e.g. admin domains/security domains) and if a L3 handoff is needed (e.g. due to change of subnet) to speed up the detection of this. Specifically, document [4] advocates adding to the 802.11 beacon the AIRD (i.e. Access Router Identity) to allow the terminal to detect the change of subnet. It is believed this would not be efficient nor work in all cases, consistent with that provided in document [5] below; and

[5] patent application Ser. No. 10/196,457 (NC17212/NC17213), by Stefano Faccin, describes a mechanism to enable optimized delivery of information to a terminal over a wireless link. Specifically, the idea therein is to avoid sending the whole IP Router Advertisement to the wireless terminals at the actual frequency it is generated by an Access Router. Instead, a functionality in the wireless point of attachment (e.g. the Access Point (AP) in WLAN or an access controller for WLAN) forwards to the terminals over L2 (e.g. the beacon in 802.11) only a subset of information (e.g. the subnet prefix) to allow the terminal to detect whether an L3 handover is implied when changing e.g. the access point (AP).

SUMMARY OF THE INVENTION

The present invention proposes a mechanism to enable a station to discover link/network/service information about a potential wireless point of attachment by extending the set of information that is available before the station actually authenticates and associates to the wireless point of attachment.

In particular, the present invention provides a method for interworking between a Wireless Local Area Network (WLAN), including that defined in IEEE 802.11 Standard Protocol, and one or more other networks, including a 3GPP, 3GPP2 or IEEE 802.16), wherein the method features extending a set of information that is available before a network node actually authenticates and associates to the wireless point of attachment.

In one embodiment, the network node is a station (STA), and the beacon contains the set of information, where the beacon is extended with information that allow a terminal to identify if mobility (handoff) to an access point (AP) implies an L3 handoff or only an L2 handoff, including information about a subnet prefix of a subnet a new AP belongs to. When a station (STA) listens to the beacon, the STA discovers that the AP can provide additional information. If the STA is interested, the STA sends a probe request indicating which information it requires, and the AP returns available information in a probe response based on the information.

The set of information may include a limited number of bits to indicate the ability of the access point (AP) to support discovery of information.

In accordance with the present invention, probe request/response messages may also be extended so that a station (STA) can request information in a probe request message and obtain them in the same, and neighbour reports may also be enhanced to include some information.

In one embodiment, two new control/action frames are provided (e.g. Information Request/Response) so that a station (STA) can request information from an access point (AP).

The method also includes providing the STA with a roaming identifier (roaming ID) so that when the STA connects to an access point (AP), the STA can provide the Roaming ID to the AP, and the AP can verify if the Roaming ID is supported or not and reply to the STA accordingly. In this case, the roaming ID may be defined by a home operator of a roaming aggregator to avoid the STA having to maintain a long list of SSIDs to help the STA identify which AP to connect to based on roaming agreements between the home operator and a current AP. The method may also include defining a Roaming Service Layer Agreement (SLA) having certain requirements related to desired services supported so that when the STA connects to the AP, the STA can provide one or more desired roaming SLA parameters to the AP, and the AP can verify if the one or more desired SLA parameters are supported or not and reply to the STA accordingly. In this case, the roaming SLA may be defined by the home operator of the roaming aggregator with different meanings for different values of roaming service, including quality and/or security of service.

The set of information may also include information to allow a station (STA) to detect that movement to a new access point (AP) requires either that a new IP address (for roaming case) be obtained or that a fast handoff at L3 is needed; information about the type of service available or supported, including: Unrestricted, Unfettered Internet Access, Restricted Access—outbound TCP, UDP, ICMP, Ipsec, Web Access only, No Access; the type of connectivity, including Ipv4, Ipv6, etc.; the type of credentials required for authentication, including no credentials required (open enrollment), one-time PIN, persistent shared-secret, username/password combination, X.509 certificate chain rooted in a trusted certificate authority, self-signed X.509 certificate (potentially plus PIN or username/password), credit card, etc.; the type of enrollment, including whether automatic enrollment is supported, whether the AP and STA support a common method of enrollment, etc.; and/or the availability of 802.21 services at L3.

The set of information may also include information about mesh/ad-hoc networks issues, including an indication the network is a mesh network; the type of mesh network; the type of authentication; the type of connectivity allowed by mesh network; the type of security solution supported; the type of routing algorithm; whether a terminal can specify the type of features that a route must satisfy; or some combination thereof.

The method may also include requesting information by a station (STA) with a requested information descriptor having a collection of parameter codes, and reply with information in a return information descriptor from an access point (AP)

The scope of the invention is also intended to include a network having one or more network nodes for providing the interworking between such a WLAN and the one or more other network technologies, wherein the one or more network nodes such as an AP is configured to extend a set of information that is available before a network node actually authenticates and associates to the wireless point of attachment, as well as one or more network nodes such as a STA for receiving and/or requesting such information and responding to the same.

Finally, the present invention is also intended to include a method having the one or more of the steps described herein performed in a computer program running on one or more processors or other suitable processing devices in one or more network nodes in such networks or systems, as well as a computer program product for one or more such network nodes for providing such an interworking.

BRIEF DESCRIPTION OF THE DRAWING

The drawing includes the following Figures, which are not necessarily drawn to scale:

FIG. 1 shows typical parts of an IEEE 802.11 WLAN system, which is known in the art.

FIGS. 2a and 2b show diagrams of the Universal Mobile Telecommunications System (UMTS) packet network architecture, which is also known in the art.

FIG. 3 is a block diagram of an access point (AP) according to the present invention.

FIG. 4 is a block diagram of a station (STA) according to the present invention.

DETAILED DESCRIPTION OF THE INVENTION

The following is a detailed description of the embodiments herein, including:

A basic embodiment, which includes extension of the beacon, Probe Request/Response messages, and Neighbour Reports in IEEE 802.11; and An extended embodiment, which includes extension of the beacon, creation of new control/action frames, and extension of Neighbour Reports in 802.11.

Also, the type of information to be provided is described in the follow (it is not meant to be exhaustive and should be considered extensible).

The Basic Embodiment

In this embodiment, the 802.11 beacon is extended with a limited number of bits to indicate the ability of the AP to support discovery of information. Optionally, the beacon is extended with information that allow the terminal to identify if mobility (handoff) to this AP implies a L3 handoff or only a L2 handoff. This can be achieved by including e.g. the subnet prefix of the subnet the new AP belongs to.

The Probe Request/Response messages are also extended so that the STA can request information in a Probe Request message and obtain them in a Probe Response message.

Also, Neighbour Reports may be optionally be enhanced to include some information.

When the STA listens to the beacon, it discovers that the AP can provide additional information. The STA then, if interested, sends a Probe Request indicating which information it requires, and the AP returns the available information in a Probe Response based on the information.

The Extended Embodiment

In this embodiment, and similar to the basic embodiment, the IEEE 802.11 beacon is extended with a limited number of bits to indicate the ability of the AP to support discovery of information. Optionally, the beacon is extended with information that allow the terminal to identify if mobility (handoff) to this AP implies a L3 handoff or only a L2 handoff. This can be achieved by including e.g. the subnet prefix of the subnet the new AP belongs to.

In addition, two new control/action frames are created (e.g. Information Request/Response) so that the STA can request information from the AP.

Also, Neighbour Reports may be optionally be enhanced to include some information.

Type of information

The type of information is described herein based on the type of issues they help solve, including:
1) Roaming/mobility related issues (target is Tgu and 802.21), e.g.:
   Identification of a roaming domain for network selection: To avoid an STA having to maintain a long list of SSIDs to help the STA identify which AP to connect to based on roaming agreements between a home operator and a current AP, a Roaming Identifier (Roaming ID) is introduced. The Roaming ID is defined by the home operator of a roaming aggregator and provided to the STA and to all roaming partners. When the STA connects to an AP, it can provide the Roaming ID to the AP (e.g. in the extended Probe Request). The AP verifies if the Roaming ID is supported or not, and replies to the STA. The AP does not need to broadcast the Roaming ID in the beacon. An example of Roaming ID is a NAI realm (e.g. roaming1.boingo.com).
   Verification of requirements support: When an STA needs to chose an AP, it desires to know whether certain requirements related to desired services are supported (e.g. quality of service (QoS), security, etc.). One solution is to define a Roaming SLA (Service Layer Agreement) parameter. The home network or roaming aggregator defines different meanings for different values of Roaming SLA, and provides such <value, meaning> tuples to the STA and the roaming partner. When the STA provides the Roaming ID, it also provides the desired Roaming SLA. The network retrieves the meaning of the Roaming SLA provided by the STA based on the Roaming ID (if supported), and verifies if the SLA level is supported. If it is, it provides a positive answer to the STA. If not, it provides a negative answer regarding the support of the Roaming SLA, and may provide other values of Roaming SLA so that the STA can decide whether it wants to connect or not.
   Identification of type of handoff: during handoff, it is essential for the STA to know whether it is entering a new domain and if the handoff entitles only an L2 handoff or requires an L3 handoff as well. The idea is to provide some information (e.g. derived from the IP Router Advertisement, as indicated in documents [4] and [5] above) to allow the STA to detect that movement to a new AP requires either to obtain a new IP address (for roaming case), or a fast handoff at L3.

Type of service available: e.g., referring to in document (1) above, this can indicate the type of service supported:Unrestricted, Unfettered Internet Access, Restricted Access—outbound TCP, UDP, ICMP, Ipsec, Web Access only, No Access.

Type of connectivity: e.g. IPv4, IPv6, etc.

Type of credentials required for authentication: no credentials required (open enrollment), one-time PIN, persistent shared-secret, username/password combination. X.509 certificate chain rooted in a trusted certificate authority, self-signed X.509 certificate (potentially plus PIN or username/password), credit card, etc.

Type of enrolment: e.g. is automatic enrolment supported? Do the AP and STA support a common method of enrolment so that the STA associates and then uses 802.1x/EAP TTLS to setup a channel to AAA Server to e.g. provide credit card information over EAP channel and obtain persistent username/password for the STA?

Availability of 802.21 services at L3: 802.21 services (command, event and information services) can be implemented through L3 transport (e.g. for initial deployment without requiring adoptions of new frames in 802.11). It is essential for a terminal to know whether such services are available or not. A bit or a service descriptor can be made available either in the beacon, or to allow the STA to query about the availability of 802.21 at L3.

Other information would be added according to necessity.

2) Mesh/ad-hoc networks issues (target is TGs), e.g.:

An indication that the network is a mesh network (e.g. so that an STA that may want to act as a MP knows this is a mesh network) type of mesh network, including:

A type of authentication:

"anchored" versus "local": e.g. if mesh is anchored through a Wireless Portal (WP, i.e. an AP connected to the wired DS), authentication is probably according to traditional 802.11i (i.e. between STA and AP, involving AS in DS and Authentication, Association and Accounting (AAA). If mesh is free-standing (i.e. not connected to any WP), authentication is based on other security associations/solutions (though it should be based on 802.1 µl anyway), indicates the type of credential the STA needs to possess to authenticate to the network.

A type of connectivity allowed by mesh network (this is in addition to the basic connectivity and service information that would be available based on the information defined for the generic roaming/handoff case):

e.g. connected to Internet or not (i.e. grounded or free-standing network).

A type of security solution supported (specifically for encryption, to allow the STA to know what security associations need to be setup).

A type of routing algorithm.

whether a terminal can specify the type of features that a route must satisfy (e.g. when an STA want to have a specific level of security).

others to be defined.

Descriptor of Information

A Requested Information descriptor will be used by the STA to request information (e.g. in extended Probe Request/Response). The descriptor will be a collection of parameter codes. Each parameter is defined in the standard and allocated, say, a 4 bits code. When the STA requests some parameters, it provides a list of parameters.

A Returned Information descriptor will be used by the AP to return the STA the request information.

FIG. 3: The Access Point (AP)

FIG. 3 shows, by way of example, an access point (AP) generally indicated as 100 according to the present invention having a beacon broadcast and processing module 102 and other access point modules 104.

In operation, the beacon broadcast and processing module 102 is configured to extend a set of information that is available before a network node actually authenticates and associates to the wireless point of attachment in accordance with the present invention and consistent with that described herein. By way of example, the functionality of the module 102 shown in FIG. 3 may be implemented using hardware, software, firmware, or a combination thereof, although the scope of the invention is not intended to be limited to any particular embodiment thereof. In a typical software implementation, the module 102 would be one or more microprocessor-based architectures having a microprocessor, a random access memory (RAM), a read only memory (ROM), input/output devices and control, data and address buses connecting the same. A person skilled in the art would be able to program such a microprocessor-based implementation to perform the functionality described herein without undue experimentation. The scope of the invention is not intended to be limited to any particular implementation using technology known or later developed in the future. Moreover, the scope of the invention is intended to include the module 102 being a stand alone module in the combination with other circuitry for implementing another module.

The other access point modules 104 and the functionality thereof are known in the art, do not form part of the underlying invention per se, and are not described in detail herein.

FIG. 4: The Station (STA)

FIG. 4 shows, by way of example, a station (STA) generally indicated as 200 according to the present invention having a beacon processing module 202 and other station modules 204.

In operation, the beacon processing module 202 may be configured to receive such a beacon signal discussed above and/or provide request for such information, including in a probe request, where the STA can indicate exactly what information it wants, so the response is customized to the request by the STA, in accordance with the present invention and consistent with that described herein. By way of example, the functionality of the module 202 shown in FIG. 4 may be implemented using hardware, software, firmware, or a combination thereof, although the scope of the invention is not intended to be limited to any particular embodiment thereof. In a typical software implementation, the module 202 would be one or more microprocessor-based architectures having a microprocessor, a random access memory (RAM), a read only memory (ROM), input/output devices and control, data and address buses connecting the same. A person skilled in the art would be able to program such a microprocessor-based implementation to perform the functionality described herein without undue experimentation. The scope of the invention is not intended to be limited to any particular implementation using technology known or later developed in the future. Moreover, the scope of the invention is intended to include the module 202 being a stand alone module in the combination with other circuitry for implementing another module.

The other station modules 204 and the functionality thereof are known in the art, do not form part of the underlying invention per se, and are not described in detail herein.

Standardization Targets

The invention targets standardization in 802.11, 802.11 TGu, 802.11u and/or IEEE 802.21 specification protocols. Traffic analysis to identify the message exchanges between an associating STA and the AP will reveal whether the solution is being implemented in the STA, the AP or both.

Advantages and Disadvantages

Advantages of the present invention include the following:
The invention allows efficient distribution of required information; and
By adding a layering of beacons/information, the impact on system capacity due to the new bits added to the beacon is kept minimal.
Disadvantages of the present invention may include the following:
The solution introduces some additional complexity; and
One may think that the exchange of information before the STA is actually authenticated with the AP may introduce security issues, specifically due to the fact that the information is not authenticated (so that a man-in-the-middle rogue AP may generate false information, or that a rogue STA may generate an unreasonable number of requests. However, in both cases the issues are not worst than with current Probe Request/Response messages, since they are not authenticated and there is no limit to the number of requests from the STA.

The Scope of the Invention

It should be understood that, unless stated otherwise herein, any of the features, characteristics, alternatives or modifications described regarding a particular embodiment herein may also be applied, used, or incorporated with any other embodiment described herein.

Although the invention has been described and illustrated with respect to exemplary embodiments thereof, the foregoing and various other additions and omissions may be made therein without departing from the spirit and scope of the present invention.

What I claim is:

1. A method for interworking between a wireless local area network and at least one of 3GPP, 3GPP2 and IEEE 802.16 network, comprising:
   receiving in an end user access device a signal indicating that an extended set of information about a wireless local area network is available before the end user access device actually authenticates and associates to a wireless point of attachment in the wireless local area network;
   sending from the end user access device an information request signal containing a request for available information from the extended set of information;
   receiving in the end user access device an information response signal containing the available information requested from the extended set of information; and
   deciding in the end user access device whether to authenticate and associate to the wireless point of attachment in the wireless local area network based at least partly on the available information received in the information response signal, wherein the available information comprises at least one of internet connectivity and Internet protocol address type support, and wherein the information request signal does not comprise a probe request.

2. A method according to claim 1, wherein a beacon signal indicates that the extended set of information is available.

3. A method according to claim 2, wherein the beacon signal is extended with information that allow a terminal to identify if mobility, including a handoff, to an access point implies a layer three handoff or only a layer two handoff, including information about a subnet prefix of a subnet a new access point belongs to.

4. A method according to claim 2, wherein when a station listens to the beacon signal, the station is configured to discover that the access point can provide additional information.

5. A method according to claim 1, wherein two new control/action frames are provided so that a station can request information from an access point.

6. A method according to claim 1, wherein the method includes providing a station with a roaming identifier so that when the station connects to an access point, the station is configured to provide the roaming identifier to the access point, and the access point is configured to verify if the roaming identifier is supported or not and reply to the station accordingly.

7. A method according to claim 6, wherein the roaming identifier is defined by a home operator of a roaming aggregator to avoid the station having to maintain a long list of service set identifiers to help the station identify which access point to connect to based on roaming agreements between the home operator and a current access point.

8. A method according to claim 6, wherein the method also includes defining a roaming service layer agreement having certain requirements related to desired services supported so that when the station connects to the access point, the station is configured to provide one or more desired roaming service layer agreement parameters to the access point, and the access is configured to verify if the one or more desired service layer agreement parameters are supported or not and reply to the station accordingly.

9. A method according to claim 8, wherein the roaming service layer agreement is defined by a home operator of a roaming aggregator with different meanings for different values of roaming service, including quality and/or security of service.

10. A method according to claim 1, wherein the extended set of information includes information to allow a station to detect that movement to a new access point requires either that a new Internet protocol address, including for a roaming case, be obtained or that a fast handoff at layer three is needed.

11. A method according to claim 1, wherein the extended set of information includes the type of service available or supported, comprising at least one of: Unrestricted, Unfettered Internet Access, Restricted Access—outbound TCP, UDP, ICMP, Ipsec, Web Access only, and No Access.

12. A method according to claim 1, wherein the available information indicates the Internet protocol versions supported by the wireless point of attachment.

13. A method according to claim 1, wherein the extended set of information includes information about the type of credentials required for authentication, including no credentials required (open enrollment), one-time PIN, persistent shared-secret, username/password combination, X.509 certificate chain rooted in a trusted certificate authority, self-signed X.509 certificate (potentially plus PIN or username/password), credit card, etc.

14. A method according to claim 1, wherein the extended set of information includes information about the type of enrollment, including whether automatic enrollment is supported, whether the access point and station support a common method of enrollment, etc.

15. A method according to claim 1, wherein the extended set of information includes information about the availability of 802.21 services at layer three.

16. A method according to claim 1, wherein the extended set of information includes information about mesh/ad-hoc networks issues, including an indication the network is a mesh network; the type of mesh network; the type of authentication; the type of connectivity allowed by mesh network; the type of security solution supported; the type of routing algorithm; whether a terminal can specify the type of features that a route must satisfy; or some combination thereof.

17. A method according to claim 1, wherein the method includes requesting information by a station with a requested information descriptor having a collection of parameter codes, and replying with information in a return information descriptor from an access point.

18. A network node, including an end user access device, for providing interworking between a wireless local area network and at least one of a 3GPP, 3GPP2 and IEEE 802.16 network, comprising:
 a processor configured to cause the network node to perform at least the following:
 receive a signal indicating that an extended a set of information about a wireless local area network is available before the end user access device actually authenticates and associates to a wireless point of attachment in the wireless local area network;
 sending from the end user access device an information request signal containing a request for available information from the extended set of information;
 receiving in the end user access device an information response signal containing the available information requested from the extended set of information; and
 deciding whether to authenticate and associate to the wireless point of attachment in the wireless local area network based at least partly on the available information received in the signal, wherein the available information comprises at least of one internet connectivity and Internet protocol address type support, and wherein the information request signal does not comprise a probe request.

19. A network node according to claim 18, wherein the network node is a station.

20. A network node according to claim 18, wherein a beacon signal contains the extended set of information.

21. A method according to claim 1, wherein the method is performed in a computer program running on a processor or other suitable processing device in a network node in the selected network or system.

22. A computer program product for a network node for providing interworking between a Wireless Local Area Network, including that defined in IEEE 802.11 Standard Protocol, and one or more other networks, including a 3GPP, 3GPP2 or IEEE 802.16, wherein the computer program product is configured with computer readable medium for containing executable code for operating a signal processing module to perform a method comprising:
 receiving in an end user device a signal indicating that an extended a set of information about a wireless local area network is available before the end user access device actually authenticates and associates to a wireless point of attachment in the wireless local area network;
 sending from the end user access device an information request signal containing a request for available information from the extended set of information;
 receiving in the end user access device an information response signal containing the available information requested from the extended set of information; and
 deciding in the end user device to authenticate and associate to the wireless point of attachment in the wireless local area network based at least partly on the available information received in the information response signal, wherein the available information comprises at least one of internet connectivity and Internet protocol address type support, and wherein the information request signal does not comprise a probe request.

23. Apparatus for a network node for providing interworking between a Wireless Local Area Network, including that defined in IEEE 802.11 Standard Protocol, and one or more other networks, including a 3GPP, 3GPP2 or IEEE 802.16, comprising:
 means for receiving a signal indicating that an extended a set of information a wireless local area network is available before the end user access device actually authenticates and associates to a wireless point of attachment in the wireless local area network;
 means for sending from the end user access device an information request signal containing a request for available information from the extended set of information;
 means for receiving in the end user access device an information response signal containing the available information requested from the extended set of information; and
 means for deciding in the end user device to authenticate and associate to the wireless point of attachment in the wireless local area network based at least partly on the available information received in the information response signal, wherein the available information comprises at least one of internet connectivity and Internet protocol address type support, and wherein the information request signal does not comprise a probe request.

* * * * *